UNITED STATES PATENT OFFICE 2,480,673

MINERAL OIL LUBRICANTS

Orland M. Reiff and Harry J. Andress, Jr., Woodbury, N. J., assignors to Socony-Vacuum Oil Company, Incorporated, a corporation of New York No Drawing. Application October 6, 1945, Serial No. 620,848

9 Claims. (Cl. 252—32.7)

This invention has to do with a method of making dithiophosphoric acids of hydroxyaromatic compounds, and particularly has to do with a method of making dithiophosphoric acids of alkyl-substituted hydroxyaromatic compounds. The invention also has to do with a method of making metal salts of said acids and, in addition, has to do with oil compositions containing said acids and/or said salts.

In the prior art, the prevailing method for the preparation of dithiophosphoric acids of hydroxyaromatic compounds is shown to be one involving a reaction of a hydroxyaromatic compound with $P_2S_5$. A hydroxyaromatic compound is reacted with the $P_2S_5$ whereupon a reaction product containing a dithiophosphoric acid of the hydroxyaromatic compound is obtained. Thereafter, any unreacted $P_2S_5$ is filtered from the reaction product and the filtrate therefrom is washed with water. Finally, the water-washed reaction product is distilled, preferably under vacuum, to remove any solvent that may be present. The acids so obtained are unstable and tend to decompose with the evolution of hydrogen sulfide; this is accelerated when the acids are heated. In addition such acids are rather undesirable for certain uses, particularly as oil addition agents, in view of their odor, dark color and corrosivity towards such metals as copper.

The present invention is predicated upon the discovery of an improvement in the aforesaid method for making dithiophosphoric acids of hydroxyaromatic compounds, particularly those acids in which the hydroxyaromatic compound contains one or more alkyl substituents. The acids obtained by this new method are superior to those obtained as described hereinabove, inasmuch as they are lighter in color, are less odorous, are less corrosive towards copper, are more heat stable, etc. Not only are the acids so improved, but the metal salts of said acids are characterized as well by a similar improvement over the corresponding metal salts of the acids obtained by the aforesaid prior art method. Accordingly, the present method is also contemplated as a means for preparing outstanding metal salts, and other derivatives, of dithiophosphoric acids of hydroxyaromatic compounds as well as for preparing said acids.

The method contemplated herein involves reacting a hydroxyaromatic compound with $P_2S_5$ to form a dithiophosphoric acid of the said hydroxyaromatic compound, and thereafter treating the reaction product with a small amount of finely divided zinc. The amount of zinc used in this method is relatively small. For example, small amounts of zinc, as from about 1 per cent to about 2 per cent based on the alkylated hydroxyaromatic compound used in the reaction provide the desired improvement. The treatment with finely divided zinc, and preferably with zinc dust, may be carried out at room temperature or at elevated temperature, preferably at about 90 to 100° C. A small amount of water is added with the zinc and is thereafter removed from the reaction mixture so obtained by heating the said reaction mixture at about 110° C.

With regard to the proportions of reactants used in the present method, the amounts of hydroxyaromatic compound and $P_2S_5$ may be varied considerably; however, it is preferred that one to two mols of $P_2S_5$ be used for every four mols of hydroxyaromatic compound. The reaction wherein a mol ratio of one to four is used may be represented by the following equation:

I. 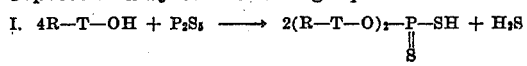

wherein R represents an alkyl group or hydrogen atom and T represents an aromatic nucleus.

The formation of the metal salts of the dithiophosphoric acids represented in Equation I above may be represented by the following equation in which a metal hydroxide is used:

II. 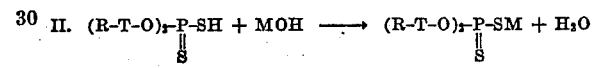

wherein R and T are as defined above and M represents the hydrogen equivalent of a metal.

The reaction product obtained by using a molar ratio of two to four is more complex than that represented in Equation I above and may be a mixture of a dithiophosphoric acid derivative and other constituents.

Examples of the hydroxyaromatic compounds or phenols which may be used are: phenol, resorcinol, hydroquinone, catechol, cresol, xylenol, hydroxydiphenyl, benzylphenol, phenylethylphenol, phenol resins, methylhydroxydiphenyl, guiacol, alpha- and beta-naphthol, alpha- and beta-methyl naphthol, tolyl naphthol, benzyl naphthol, anthranol, phenylmethyl naphthol, phenanthrol, monomethylether of catechol, anisole, beta-naphthyl methylether, chlorphenol and the like. Preference, in general, is given the monohydroxy phenols otherwise substituted, particular preference being given to phenol and alpha- and beta-naphthols.

When alkyl-substituted hydroxyaromatic compounds are reacted with $P_2S_5$, the alkyl substituent or substituents may be relatively low molecular weight paraffin groups typified by methyl, ethyl, propyl, etc. or relatively high molecular weight alkyl groups, such as those typified by paraffin wax groups. In preparing the alkyl-substituted hydroxyaromatic compounds, a hydroxyaromatic compound may be reacted with an alkyl halide, particularly an alkyl chloride in the presence of a Friedel-Crafts catalyst. Typical chlorides are methyl, propyl, amyl, decyl and paraffin wax chlorides. The halides, particularly the chlorides, of relatively high molecular weight paraffins, such as paraffin waxes, are desirable for use in preparing dithiophosphoric acids and their corresponding metal salts, which are characterized by substantial miscibility or solubility in hydrocarbon fractions such as mineral lubricating oils. For example, petroleum wax which is a paraffinic hydrocarbon obtained from petroleum and which has at least about 20 carbon atoms in the molecule can be chlorinated to various degrees to obtain several chlorine-substituted waxes, such as monochlorowax, dichlorowax, etc. Particular preference is given to those chlorowaxes obtained by chlorination of a petroleum wax having a melting point not substantially less than 120° F., a molecular weight of about 250 and having at least about 20 carbon atoms to the molecule. It will be understood from this description that the term "chlorowax" when used herein will refer to a material containing one or more chlorine atoms and a relatively high molecular weight alkyl group or radical obtained from a hydrocarbon fraction identified as paraffin wax.

For example, paraffin wax-substituted phenol prepared according to the above procedure, in which a quantity of chlorowax containing three atomic proportions of chlorine is reacted with one mol of phenol and in which the chlorowax contains 20 per cent chlorine, will for brevity herein be designated "wax-phenol (3—20)". Parenthetical expressions of the type (A—B) are used hereafter in connection with the alkyl-substituted hydroxyaromatic compounds to designate:

(A) the number of atomic proportions of chlorine in the chlor-aliphatic material reacted with one mol of a hydroxyaromatic compound in a Friedel-Crafts reaction, and (B) the chlorine content of the chloraliphatic material. In the above example, A=3 and B=20. This same designation is also applied to the dithiophosphoric acids, and the metal salts thereof, of these alkylated compounds.

Although any of the catalysts of the group known as Friedel-Crafts catalysts may be used in preparing the desired alkyl-substituted hydroxyaromatic compounds, aluminum chloride is preferred. It will be apparent, of course, that alkyl-substituted hydroxyaromatic compounds prepared by procedure other than the Friedel-Crafts synthesis can be used. For example, the alkyl-substituted hydroxyaromatic compounds may be prepared by reacting an olefin and a hydroxyaromatic compound in the presence of a suitable condensing agent such as sulfuric acid.

Metal salts of the dithiophosphoric acids obtained by the method contemplated herein may be prepared by any of the well-known procedures for making metal salts of organic acids. By way of illustration, the sodium salt may be prepared by reacting a dithiophosphoric acid with a sodium alcoholate, and thereafter distilling off the alcohol present in the reaction mixture thus obtained. Other metal salts may be prepared from the sodium salt by metathesis with a suitable metal compound such as a halide. As indicated above, when a substantially inert diluent is used in the reaction of $P_2S_5$ with an alkyl-substituted hydroxyaromatic compound, the diluent may be removed prior to the formation of a metal salt or may be removed after the metal salt has been formed. Also a mineral lubricating oil concentrate or blend containing a dithiophosphoric acid of the type described above, or metal salt thereof, may be prepared by using a substantially inert mineral lubricating oil as the diluent and retaining the said diluent.

The metals contemplated herein may be broadly classified as metals of the groups I through VIII of the periodic system. These metals comprise the following: The alkali metals lithium, sodium, potassium, rubidium, and caesium; the alkaline earth metals beryllium, magnesium, calcium, strontium and barium; the metals zinc, cadmium, and mercury; scandium, lanthanum; aluminum, gallium, indium, thallium, titanium, zirconium, cerium, thorium, germanium, tin and lead; vanadium, columbium and tantalum; arsenic, antimony and bismuth; chromium, molybdenum, tungsten and uranium; rhenium, manganese, iron, cobalt and nickel; ruthenium, rhodium, palladium; osmium, iridium and platinum.

Some of the rare earth metals are mentioned in the foregoing passage. Other rare earth metals suitable for formation of dithiophosphoric acid salts are those now commercially available as the cerium and yttrium group, namely, a mixture of praseodymium, neodymium, samarium, europium, gadolinium, terbium, dysprosium, holmium, erbium, thallium and lutecium.

Further details in the method of preparation contemplated herein will be apparent from the following illustrative examples:

EXAMPLE I

*Preparation of dithiophosphoric acid of wax-phenol (3–14)*

Petroleum wax of A. S. T. M. melting point of 126° F. (about 52° C.) was chlorinated by introducing chlorine gas at about 100° C. until 14 per cent by weight of chlorine was adsorbed therein. One hundred grams of the chlorowax so obtained were mixed with 12.3 grams of phenol and 3 grams of $AlCl_3$ were added at about 65° C., at a rate slow enough to avoid excessive foaming caused by the evolution of hydrogen chloride. The reaction temperature was then raised to about 175° C. and the mixture was stirred for about one hour at this temperature to complete the reaction. The product at this stage was the aluminum phenate of wax-phenol (3–14), containing combined chlorine.

To the aluminum phenate of wax-phenol (3–14) obtained above, at about 100° C., water was carefully added with stirring thereby converting the said aluminum phenate to wax-phenol (3–14). Several washings with water were required to obtain a water extract free of aluminum chloride. Small amounts of butanol were added to break emulsions formed upon the addition of water, and butanol was then removed by distillation to obtain the finished product, wax-phenol (3–14).

A solvent-refined mineral oil (207 grams) of Saybolt Universal viscosity (S. U. V.) of 45 seconds at 210° F. was then added to the wax-phenol (3–14) followed by 7.4 grams of $P_2S_5$. The resulting mixture was heated for four hours at about 175° C. The reaction mixture was then cooled to about 100° C., and 2 grams of zinc dust (2% based on the wax-phenol used) and 0.5 gram of water were added thereto with stirring. After treating with zinc dust for 15–20 minutes the resulting reaction product was then filtered through a diatomaceous clay of the activated montmorillonite type represented by the ideal formula $Al_2Si_4O_{10}(OH)_2.nH_2O$, wherein $n$ is an integer, and the filtrate thus obtained was vacuum distilled to remove water therefrom. The product (Product I) obtained is a one to three blend in mineral oil; it contained 0.6 per cent phosphorus and 1.0 per cent sulfur and had a neutralization number of 6.3. These values approximate the theoretrical values for the dithiophosphoric acid of wax-phenol (3–14).

In view of the foregoing it will be clear to those familiar with the art that a dithiophosphoric acid of the foregoing type will be obtained free from oil when a diluent is not used in the preparation, or when a lower boiling diluent, such as kerosene which can be removed thereafter by dilution, is used. It will be apparent then that the present method provides a particularly desirable means for preparing dithiophosphoric acids (and metal salts thereof) of alkyl-substituted hydroxyaromatic compounds per se as well as in the form of mineral oil compositions or concentrates.

EXAMPLE II

The procedure described in Example I above was followed in every detail with the exception that zinc dust and water were not used. The product—Product II—so obtained was a one to three blend of wax-phenol dithiophosphoric acid (3–14) in mineral oil. This product contained 0.6 per cent phosphorus, 1.1 per cent sulfur and had a neutralization number (N. N.) of 7.0.

That the compounds obtained by the present method, as typified by Product I above, are more stable to heat than the corresponding compounds obtained by previous procedures, as typified by Product II, is clearly shown by the behavior of Products I and II under normal storage conditions. Those compounds typified by Product II continue to evolve hydrogen sulfide slowly under such conditions, which is indicative of their relative heat instability. On the other hand the corresponding compounds such as Product I are not so characterized, for they have a very faint odor of hydrogen sulfide and evolve appreciable amounts of hydrogen sulfide only when heated to temperatures of the order of 175° C.

The compounds obtained in this method are valuable as multifunctional mineral oil addition agents inasmuch as they affect substantial improvement of such properties as pour point, viscosity index, oxidation characteristics, etc., when used in small amounts in mineral oils. They are particularly desirable for use in oils as they impart less color to the oils in which they are incorporated, than do the corresponding compounds prepared by prior art methods such as those referred to hereinabove. Also, compounds obtained by the new method are desirable for such purpose as they are less odorous and more stable to heat than the aforesaid prior art compounds. For example, a one per cent blend of Product I in a mineral oil fraction had a Tag Robinson color of 8½; whereas, a similar one per cent blend containing Product II had a Tag Robinson color of only 4½. Color values of the corresponding barium salts demonstrate the same order of improvement. By way of illustration a one per cent blend of the barium salt of Product I had a Tag Robinson color of 5 as against a color of only 2½ for the corresponding blend of the barium salt of Product II.

Furthermore, the different kind of action possessed by the products obtained by the improved method is demonstrated by their relative freedom from corrosivity toward copper. A one per cent blend of Product I in a mineral oil fraction was heated at 100° C. with a clean polished copper strip immersed therein. After one hour the strip was still bright and the strip had but a slight coloration after twenty-four hours. A similar one per cent blend with Product II gave a black strip after but one hour of heating under the same conditions. The foregoing distinctions are summarized below in Table I:

Table I

| Characteristics | Product I | Product II |
| --- | --- | --- |
| Odor | Very faint $H_2S$ | $H_2S$ evolved. |
| Color (Tag Robinson) | 8½ | 4½. |
| Copper Strip Test: | | |
| 1 hour | Bright Strip | Black. |
| 24 hours | Passable Strip | |

| | Barium Salts of— | |
| --- | --- | --- |
| | Product I | Product II |
| Color (Tag Robinson) | 5 | 2½ |

This application is a continuation-in-part of our application Serial No. 489,086 filed May 29, 1943, now U. S. Patent No. 2,386,207, issued October 9, 1945.

We claim:

1. The method of making a dithiophosphoric acid of an alkyl-substituted phenol which comprises: reacting an alkyl halide with phenol in the presence of a Friedel-Crafts catalyst to alkylate said phenol; washing the alkyl-substituted phenol product thus obtained with water to remove the Friedel-Crafts catalyst therefrom; reacting the catalyst-free, alkyl-substituted phenol with phosphorus pentasulfide to form a dithiophosphoric acid of the alkyl-substituted phenol; treating the dithiophosphoric acid of the alkyl-substituted phenol with at least about 1% of zinc and at least about 0.5% of water, based on the amount of alkyl-substituted phenol used, at a temperature of about 100° C.; and separating the zinc-treated dithiophosphoric acid of the alkyl-substituted phenol from the reaction mixture formed in the last-mentioned operation.

2. The method of making a dithiophosphoric acid of a paraffin wax-substituted phenol, which comprises: reacting a chlorinated paraffin wax with phenol in the presence of a Friedel-Crafts catalyst to alkylate said phenol with paraffin wax; washing the paraffin wax-substituted phenol product thus obtained with water to remove the Friedel-Crafts catalyst therefrom; reacting the catalyst-free paraffin wax-substituted phenol with phosphorus pentasulfide to form a dithiophosphoric acid of the paraffin wax-substituted phenol; treating the said dithiophosphoric acid of the paraffin wax-substituted phenol with at least about 1% of zinc and at least about 0.5% of water, based on the amount of wax-substituted phenol used at a temperature of about 100° C.; and separating the zinc-treated dithiophosphoric acid from the reaction mixture formed in the last-mentioned operation.

3. The method of making a dithiophosphoric acid of an alkyl-substituted phenol which comprises: reacting an alkyl halide with phenol in the presence of a Friedel-Crafts catalyst to alkylate said phenol; washing the alkyl-substituted phenol product thus obtained with water to remove the Friedel-Crafts catalyst therefrom; reacting the catalyst-free alkyl-substituted phenol with phosphorus pentasulfide to form a dithiophosphoric acid of the alkyl-substituted phenol, the molar quantity of phosphorus pentasulfide so reacted being about ¼ the quantity of the alkyl-substituted phenol; treating the dithiophosphoric acid of the alkyl-substituted phenol with at least about 1% of zinc and at least about 0.5% of water, based on the amount of alkyl-substituted phenol used at a temperature of about 100° C.; and separating the zinc-treated dithiophosphoric acid of the alkyl-substituted phenol from the reaction formed in the last-mentioned operation.

4. The method of making a metal salt of a dithiophosphoric acid of an alkyl-substituted phenol which comprises: reacting an alkyl halide with phenol in the presence of a Friedel-Crafts catalyst to alkylate said phenol; washing the alkyl-substituted phenol product thus obtained with water to remove the Friedel-Crafts catalyst therefrom; reacting the catalyst-free, alkyl-substituted phenol with phosphorus pentasulfide to form a dithiophosphoric acid of the alkyl-substituted phenol; treating the said dithiophosphoric acid of the alkyl-substituted phenol with at least about 1% of zinc and at least about 0.5% of water, based on the amount of alkyl-substituted phenol used, at a temperature of about 100° C.; separating the zinc-treated dithiophosphoric acid of the alkyl-substituted phenol from the reaction mixture formed in the last-mentioned operation; and substituting said treated dithiophosphoric acid with metal.

5. The method of making a metal salt of a dithiophosphoric acid of a paraffin wax-substituted phenol which comprises: reacting a chlorinated paraffin wax with phenol in the presence of a Friedel-Crafts catalyst to alkylate said phenol with paraffin wax; washing the paraffin wax-substituted product thus obtained with water to remove the Friedel-Crafts catalyst therefrom; reacting the catalyst-free paraffin wax-substituted phenol with phosphorus pentasulfide to form a dithiophosphoric acid of the paraffin wax-substituted phenol; treating the said dithiophosphoric acid of the paraffin wax-substituted phenol with at least about 1% of zinc and at least about 0.5% of water, based on the amount of wax-substituted phenol used at a temperature of about 100° C.; separating the zinc-treated dithiophosphoric acid from the reaction mixture formed in the last-mentioned operation; and substituting said zinc-treated dithiophosphoric acid with metal.

6. The method of making a mineral oil concentrate containing a dithiophosphoric acid of an alkyl-substituted phenol which comprises: reacting an alkyl halide with phenol in the presence of a Friedel-Crafts catalyst to alkylate said phenol; washing the alkyl-substituted phenol product thus obtained with water to remove the Friedel-Crafts catalyst therefrom; reacting the catalyst-free alkyl-substituted phenol with phosphorus pentasulfide in the presence of a substantially inert mineral oil to form a mineral oil concentrate containing a dithiophosphoric acid of the alkyl-substituted phenol, the molar quantity of phosphorus pentasulfide so reacted being about ¼ the quantity of the alkyl-substituted phenol; treating the said mineral oil concentrate containing the said dithiophosphoric acid of the alkyl-substituted phenol with at least about 1% of zinc and at least about 0.5% of water, based on the amount of phenol used, at a temperature of about 100° C.; and separating the said mineral oil concentrate containing the zinc-treated dithiophosphoric acid from the reaction mixture formed in the last-mentioned operation.

7. The method of making a mineral oil concentrate containing a dithiophosphoric acid of a paraffin wax-substituted phenol which comprises: reacting a chlorinated paraffin wax with phenol in the presence of a Friedel-Crafts catalyst to alkylate said phenol with paraffin wax; washing the paraffin wax-substituted phenol product thus obtained with water to remove the Friedel-Crafts catalyst therefrom; reacting the catalyst-free paraffin wax-substituted phenol with phosphorus pentasulfide in the presence of a substantially inert mineral oil to form a mineral oil concentrate containing a dithiophosphoric acid of the paraffin wax-substituted phenol, the molar quantity of phosphorus pentasulfide so reacted being about ¼ the quantity of phenol in the paraffin wax-substituted phenol; treating the said mineral oil concentrate containing the said dithiophosphoric acid of the paraffin wax-substituted phenol with at least about 1% of zinc and at least about 0.5% of water, based on the amount of wax-substituted phenol used, at a temperature of about 100° C.; and separating the said mineral oil concentrate containing the zinc-treated dithiophosphoric acid from the reaction mixture formed in the last-mentioned operation.

8. The method of making a mineral oil concentrate containing a metal salt of a dithiophosphoric acid of an alkyl-substituted phenol which comprises: reacting an alkyl halide with phenol in the presence of a Friedel-Crafts catalyst to alkylate said phenol; washing the alkyl-substituted phenol product thus obtained with water to remove the Friedel-Crafts catalyst therefrom; reacting the catalyst-free alkyl-substituted phenol with phosphorus pentasulfide in the presence of a substantially inert mineral oil to form a mineral oil concentrate containing a dithiophosphoric acid of the alkyl-substituted phenol, the molar quantity of phosphorus pentasulfide so reacted being about ¼ the quantity of the alkyl-substituted phenol, treating the said mineral oil concentrate containing the said dithiophosphoric acid of the alkyl-substituted phenol with at least about 1% of zinc and at least about 0.5% of water, based on the amount of alkyl-substituted phenol used, at a temperature of about 100° C.; separating the said mineral oil concentrate containing the zinc-treated dithiophosphoric acid from the reaction mixture formed in the last-mentioned operation; and substituting the zinc-treated dithiophosphoric acid in said mineral oil concentrate with metal.

9. The method of making a mineral oil concentrate containing a metal salt of a dithiophosphoric acid of a paraffin wax-substituted phenol which comprises: reacting a chlorinated paraffin wax with phenol in the presence of a Friedel-Crafts catalyst to alkylate said phenol, washing the paraffin wax-substituted phenol product thus obtained with water to remove the Friedel-Crafts catalyst therefrom; reacting the catalyst-free paraffin wax-substituted phenol with phosphorus pentasulfide in the presence of a substantially inert mineral oil to form a mineral oil concentrate containing a dithiophosphoric acid of the paraffin wax-substituted phenol, the molar quantity of phosphorus pentasulfide so reacted being about ¼ the quantity of phenol in the paraffin wax-substituted phenol; treating said mineral oil concentrate containing the said dithiophosphoric acid of the paraffin wax-stubstituted phenol with at least about 1% of zinc and at least about 0.5% of water, based on the amount of wax-substituted phenol used, at a temperature of about 100° C.; separating the said mineral oil concentrate containing the zinc-treated dithiophosphoric acid from the reaction mixture formed in the last-mentioned operation; and substituting the zinc-treated dithiophosphoric acid in said mineral oil concentrate with metal.

ORLAND M. REIFF.
HARRY J. ANDRESS, Jr.

REFERENCES CITED

The following references are of record in the file of this patent:

UNITED STATES PATENTS

| Number | Name | Date |
| --- | --- | --- |
| 2,316,086 | MacLaren | Apr. 6, 1943 |
| 2,386,207 | Reiff et al. | Oct. 9, 1945 |

Certificate of Correction

Patent No. 2,480,673                                               August 30, 1949

ORLAND M. REIFF ET AL.

It is hereby certified that errors appear in the printed specification of the above numbered patent requiring correction as follows:

Column 3, line 61, for the word "procedure" read *procedures*; column 7, line 22, after "reaction" insert *mixture*; column 9, line 10, for "wax-stubstituted" read *wax-substituted*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*